May 2, 1939.  J. A. WESSELER  2,157,063
THERMOHYDROMETER
Filed Jan. 30, 1937    3 Sheets-Sheet 1
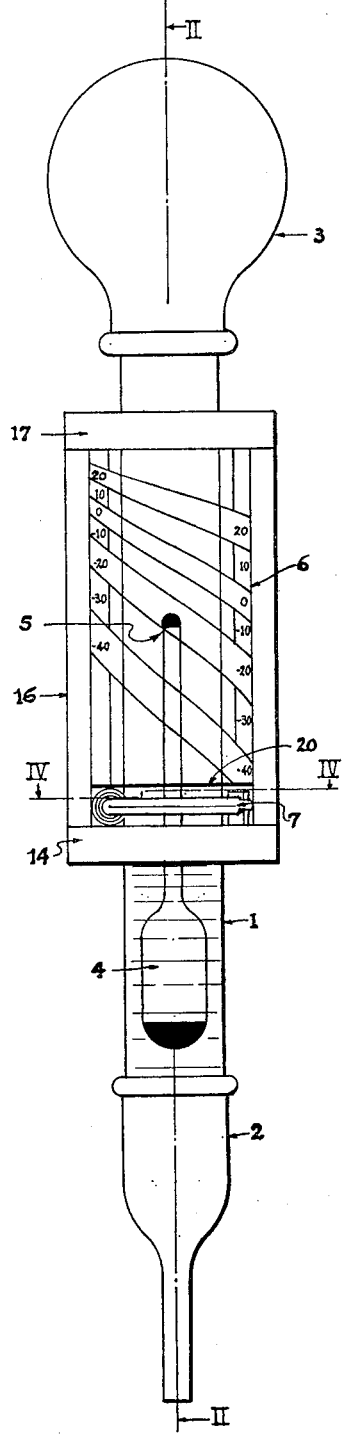
FIGURE I
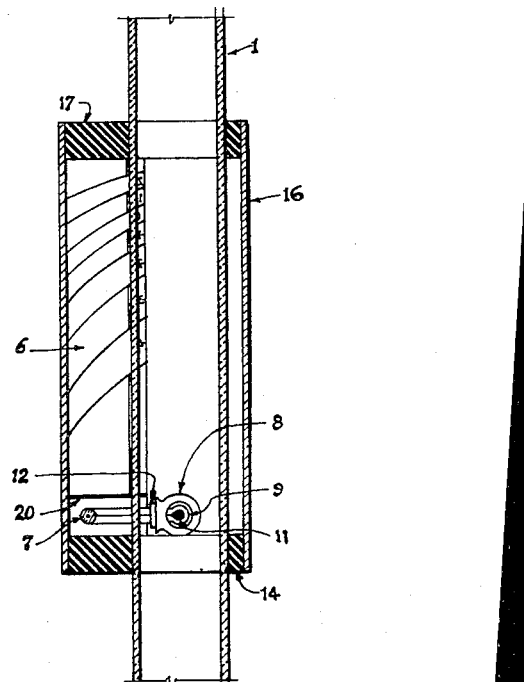
FIGURE II
INVENTOR:
Julian A. Wesseler
By Francis M. Crawford
ATTORNEY.

May 2, 1939.   J. A. WESSELER   2,157,063
THERMOHYDROMETER
Filed Jan. 30, 1937   3 Sheets-Sheet 2
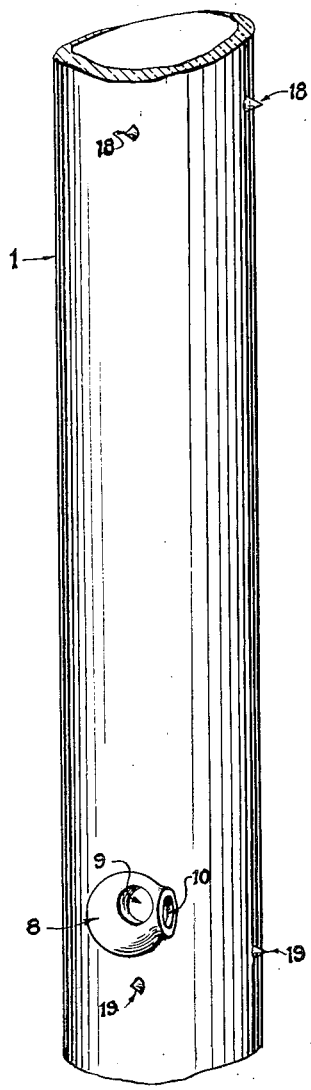
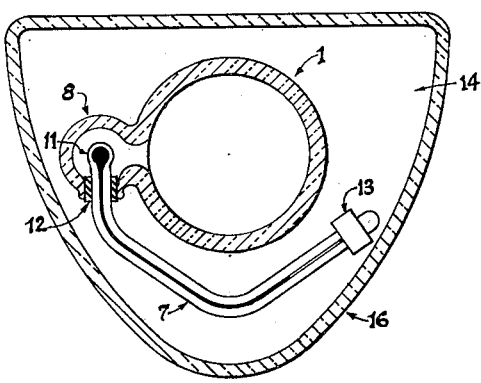
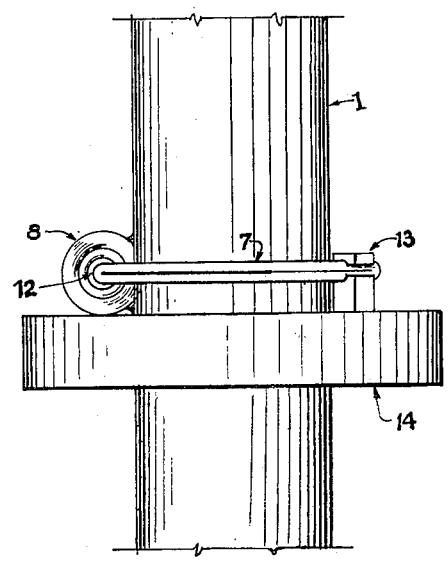
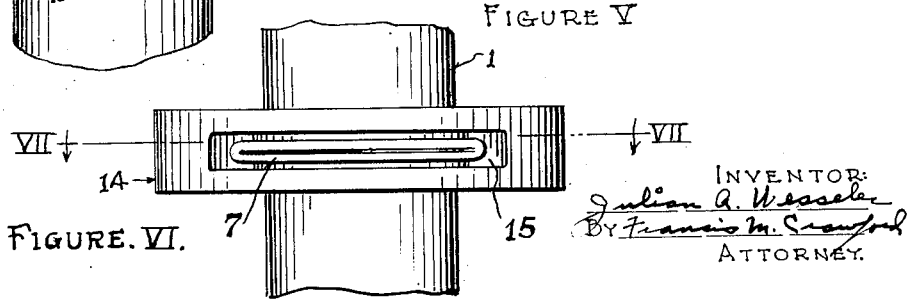
INVENTOR:
Julian A. Wesseler
By Francis M. Crawford
ATTORNEY.

May 2, 1939.    J. A. WESSELER    2,157,063
THERMOHYDROMETER
Filed Jan. 30, 1937    3 Sheets-Sheet 3
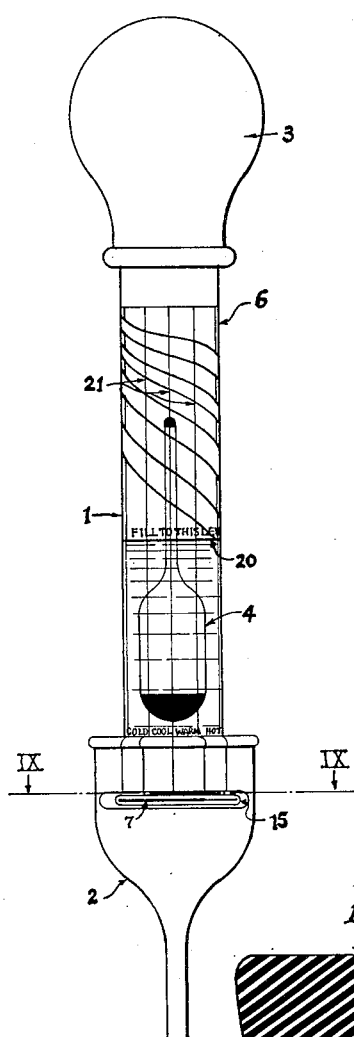
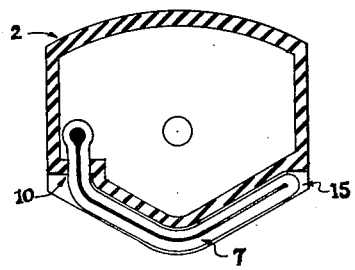
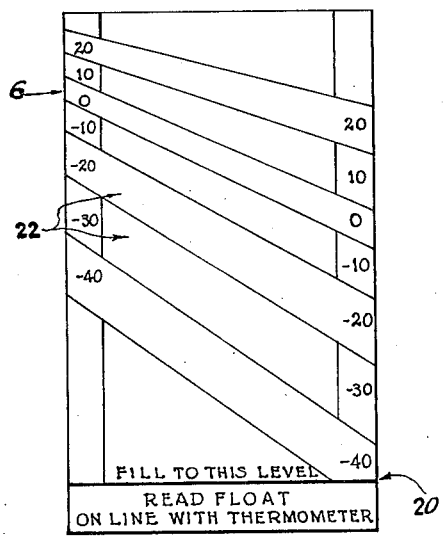
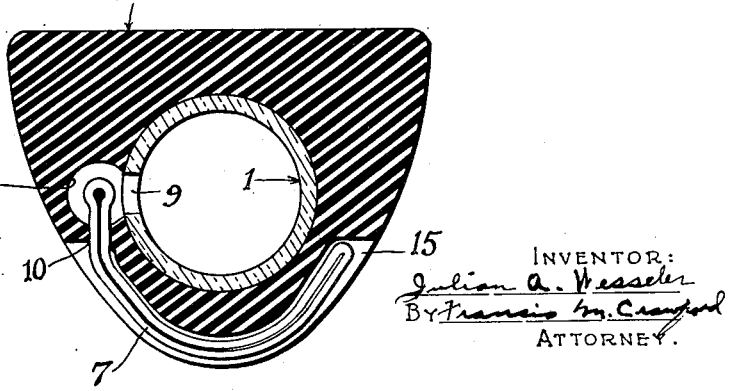

Patented May 2, 1939

2,157,063

UNITED STATES PATENT OFFICE 2,157,063

THERMOHYDROMETER

Julian A. Wesseler, Crestwood, N. Y., assignor to Commercial Solvents Corporation, Terre Haute, Ind., a corporation of Maryland Application January 30, 1937, Serial No. 123,134

8 Claims. (Cl. 265—46)

My invention relates to improvements in hydrometers for measuring specific gravities of liquids under varying temperature conditions. More specifically, my invention relates to an improved thermo-hydrometer which will indicate directly temperature-corrected specific gravities without the necessity of employing auxiliary charts or the like.

An object of my invention is to provide an instrument of this character which will be suitable for measuring specific gravities within a relatively wide temperature range such as that encountered in testing anti-freeze solutions in automobile radiators and the like.

A further object of my invention is to provide co-operative temperature indicating means and gravity indicating means whereby a single visual reading will indicate directly temperature-corrected specific gravity.

Another object of my invention is to provide improved gravity indicating means for use in an instrument of this type, and to provide an improved structure for incorporating such indicating means in the hydrometer.

A still further object of my invention is to provide improved temperature indicating means for use in such an instrument, and to provide a suitable structure for incorporating the temperature indicating means in the hydrometer and in co-operative relationship with the gravity indicating means.

Other objects and advantages of my invention will be evident from the following description. My invention will be described with reference to preferred modifications which are illustrated in the drawings, but it is to be understood, of course, that these modifications are illustrative only, and do not limit the scope of the invention.

In the drawings, Fig. I is a front elevational view of a complete hydrometer. Fig. II is a section through II—II of Fig. I. Fig. III is a perspective view of a section of the hydrometer tube showing the thermometer bulb chamber and the positioning means for the scale mounting. Fig. IV is a section through IV—IV of Fig. I, and Fig. V is an elevational view of a section of the hydrometer tube and one of the scale positioning members, showing the mounting for the thermometer. Fig. VI is an elevational view of a section of the hydrometer tube and one of the scale positioning members, showing an alternative thermometer mounting, and Fig. VII is a section through VII—VII of Fig. VI. Fig. VIII is a front elevational view of an alternative form of the hydrometer, and Fig. IX is a section through IX—IX of Fig. VIII. Fig. X is a plan view of a suitable specific gravity scale.

In its generic aspects, the hydrometer of the present invention comprises the usual transparent tube 1, filling means 2 and 3, and float 4, together with the improved gravity indicating means and the co-operative temperature indicating means. In the modifications shown, the gravity indicating means comprise a visual indicator 5 in a fixed position on the stem of the float and a gravity indicating scale 6 in a fixed position on the body of the hydrometer. The co-operative temperature indicating means comprises a thermometer 7 in a fixed position relative to the scale 6. These features and their co-operative relationship will be described in greater detail below.

In the modification illustrated in Figures I to V inclusive, the hydrometer tube 1 is fitted with a suitable chamber 8 communicating with the interior of the tube through an opening 9, and having an exterior opening 10 to permit the insertion of the thermometer bulb 11. The chamber 8 may comprise any suitable structure, but if the tube 1 is of conventional glass construction the chamber may simply be blown on the side of the tube as shown in Figure III.

The thermometer 7 is horizontally disposed with its bulb positioned within the chamber 8 and its stem passing through the external opening 10 of the chamber and extending approximately concentrically around the tube 1. In order to minimize the cost of the thermometer construction, it may be bent as shown in Fig. IV rather than in true concentric relation to the tube 1. The thermometer may suitably be mounted by means of a resilient sleeve 12 positioned in the opening 10 of the chamber 8, and by means of a resilient positioning member 13 disposed in fixed relation to the tube 1.

The sleeve 12 may suitably be constructed of rubber or any other resilient material which is not affected by the solutions to be tested, and may simply comprise a piece of rubber tubing or a one-hole rubber stopper.

The positioning member 13 may suitably comprise a block of resilient material, such as rubber, either integral with or attached to the scale spacing ring 14. The resilient block is suitably provided with a horizontal slot, or channel, as shown in Fig. V, adapted to receive and retain the stem of the thermometer in spaced relation to the tube 1.

An alternative form of thermometer mounting is illustrated in Figures VI and VII. In this case the thermometer bulb chamber is not integral with the hydrometer tube but is formed in a resilient ring which fits tightly around the tube. This ring may suitably comprise one of the spacing rings utilized for the support of the scale, and is so designated in the drawings. In the modification shown, the thermometer bulb chamber 8 is formed in the body of the spacing ring 14 and communicates with the interior of the hydrometer tube 1 through the opening 9. The exterior opening 10 of the thermometer bulb chamber 8, which is designed to provide a tight fit around the stem of the thermometer 7, communicates with a peripheral channel 15 adapted to house and support the thermometer stem. In this manner the thermometer is resiliently supported and protected from breakage, and the tight fit of the resilient material around the opening in the hydrometer tube and around the thermometer stem at the exterior opening of the bulb chamber ensures a liquid tight seal.

The gravity indicating scale 6 is mounted vertically on the hydrometer in co-operative relationship to the thermometer 7, preferably being positioned approximately parallel, horizontally, to the thermometer stem. In the modifications previously described, the scale 6 is superimposed on a transparent sleeve 16 which is affixed to the tube 1 by means of two resilient spacing rings 14 and 17. The sleeve 16 may be constructed of a material such as celluloid or cellulose acetate on which the scale 6 may be applied by any suitable means, such as by printing. The spacing rings 14 and 17 may be constructed of rubber or other resilient material and may suitably be stamped from sheets in the exact size to give a tight slip fit between the tube 1 and the sleeve 16. The mounting may then be effected merely by such slip fit, or the rings may be cemented or otherwise affixed to the tube 1 and the sleeve 16. A preferred method for preventing displacement of the spacing rings is to fit the tube 1 with small projections 18—19 as shown in Fig. III. These may suitably comprise glass prongs blown or molded onto the tube 1. These prongs embed themselves in the resilient spacing rings and thus effectively prevent displacement of the scale relative to the tube.

In addition to the scale 6 there is superimposed on the sleeve 16 an indicating line 20 which marks the level to which the tube 1 is to be filled with the liquid to be tested. This indicating line should be positioned above the thermometer level in order that the thermometer bulb will be surrounded with liquid during the test.

An alternative method for mounting the scale is illustrated in the modification of the hydrometer shown in Figs. VIII and IX. This modification also illustrates a further method for mounting the thermometer, which is particularly adapted for use in conjunction with the scale mounting utilized in this structure. In this form of the hydrometer, the scale 6 and the liquid level line 20 are carried directly on the hydrometer tube 1, or on a transparent sheet or sleeve directly superimposed on said tube. The thermometer is mounted in the resilient filling member 2, in a manner similar to that utilized for mounting the thermometer in the resilient scale spacing member, illustrated in Figs. VI and VII. The member 2 is provided with a peripheral channel 15 communicating with the interior chamber of said member through an opening 10, adapted to provide a tight fit around the stem of the thermometer adjacent the bulb. The interior chamber of the member 2 thus serves as the thermometer bulb chamber, and the channel 15 serves to support and house the thermometer stem. In this modification the thermometer is spaced some distance vertically from the scale, and it is therefore desirable, in order to facilitate alignment of the float stem with the end of the liquid column in the thermometer, to provide vertical guide lines 21. These guide lines may suitably divide the scale horizontally into temperature zones which may be designated as such in the manner illustrated in Fig. VIII, and these lines should preferably be extended onto the member 2, as far as the channel 15, as shown in this drawing.

In the scale 6, for use with any of the modifications of the hydrometer described above, the axis of the abscissae represents the range of temperature registrable by the position of the fluid in the stem of the thermometer 7, and the axis of the ordinates represents the range of specific gravity registrable by the vertical position of the visual indicator 5 when the liquid level is maintained at the indicating line 20. The ranges of temperature and gravity to be covered by the scale will depend on the particular use to which the hydrometer is to be put and upon the degree of accuracy desired. A suitable scale for an anti-freeze hydrometer is illustrated in Fig. X, in which the axis of the abscissae represents a temperature range of 40° F. to 160° F. and the axis of the ordinates represents a range of specific gravity for aqueous ethyl alcohol solutions corresponding to freezing points of —40° F. to +20° F. A scale of such proportions is adequate for most testing of ethyl alcohol, methyl alcohol, ethylene glycol, glycerine, or other anti-freeze solutions, and enables the degree of protection to be read directly in terms of the freezing point of the solution.

The scale may be subdivided in any convenient manner, as, for example, into areas representing sub-ranges of temperature and specific gravity. However, for ease of reading, I prefer to utilize divisions such as shown in Fig. X, in which the scale is merely divided into bands 22 representing sub-ranges of specific gravity. In the case of anti-freeze hydrometers, the bands may be calibrated in terms of the mean freezing point of a solution within the sub-range of specific gravity, as shown.

The horizontal dimensions of the bands 22 will, of course, depend upon the dimensions of the thermometer employed. The length of the horizontal axis of the scale, and, hence, of the horizontal component of each band, will be the same as the length of the thermometer capillary tube in which the desired range of temperature is registered. The same linear unit per degree temperature will apply to both the thermometer and the horizontal calibration of the scale when the thermometer and scale are approximately adjacent and parallel.

The vertical dimensions of the bands 22 of the scale will depend upon the range of specific gravity desired to be covered in each band, and upon the dimensions and weight of the float employed. In the case of an anti-freeze hydrometer, a convenient method is to determine experimentally the ordinates for test solutions freezing at —45° F., —35° F., —25° F., —15° F., —5° F., +5° F., +15° F., and +25° F., the determinations being made at various temperatures over the test range. The resulting curves will define bands having mean freezing point values of −40° F. to +20° F. as shown in Fig. X. The ordinates defining the bands of the scale for any given float may also be calculated from the dimensions and weight of the float, using the following expressions:

$$L_D = \frac{W}{A} \cdot \frac{D-D'}{DD'}$$

$$L_t = \frac{W}{A} \cdot \frac{D_t - D_t'}{D_t D_t'}$$

$$H = \frac{VD - W}{AD}$$

In the above expressions:
W = weight of float (g.)
V = volume displacement of float below fixed visual indicator (cm³)
A = cross-sectional area of float stem (cm²)
D = any specific gravity (g/cm³)
D' = any specific gravity less than D (g/cm³)
$L_D$ = vertical length between calibration marks for D and D' (cm.)
$D_t$ = specific gravity of a test solution at temperature $t$ (g/cm³)
$D_t'$ = specific gravity of the same test solution at temperature $t'$ (g/cm³)
$L_t$ = vertical length between calibration marks for $D_t$ and $D_t'$ (cm.)
H = height of calibration mark for D above constant level filling line (cm.)

Taking as a specific example a float of the usual type, having the visual indicator at the top of the stem as shown in Fig. I, and having a weight of 9.5 g. and a stem of 4.5 mm. outside diameter, the overall vertical length of the scale ranges between 4.3 cm. and 6.7 cm. when measuring at temperatures from 40° F. to 160° F. and covering the specific gravity range of aqueous solutions of pure ethyl alcohol freezing between −40° F. and +20° F. The relative proportions of the bands of such a scale are shown in Fig. X. A scale of these dimensions will be found to be adequate for the accuracy required in testing automobile anti-freeze solutions and the like. However, it will be evident to one skilled in the art that any degree of accuracy for any given purpose may be obtained by choosing suitable dimensions for the float and for the scale.

The operation of my improved hydrometer will be seen to be extremely simple, involving no reference to auxiliary charts or the like. The liquid is drawn into the tube I in the usual manner by inserting the tubular extension of the member 2 into the liquid and operating the filling bulb 3. The liquid level is then adjusted to the line 20 and is held at this point until temperature equilibrium has been attained and a reading has been taken. The adjustment of the liquid level can be facilitated, if desired, by providing a manually closable orifice in the bulb 3, or in the tube I above the normal liquid level, in which case the level may be adjusted by controlling the air admitted through this orifice, as in the operation of a calibrated pipette. With the liquid level maintained at this point the liquid surrounds the bulb II of the thermometer, and equilibrium is soon attained with the result that the fluid within the stem of the thermometer reaches a definite horizontal position. The device is then rotated until the stem of the float is in vertical alignment with the end of the column of fluid in the thermometer. This alignment may be accomplished by sighting across the end of the column of fluid in the thermometer in a device such as illustrated in Figure I or may be accomplished by the aid of the vertical guide lines in a device such as illustrated in Figure VIII. After alignment in this manner the visual indicator 5 of the float will then be visible in one of the bands 22 of the scale. When employing a scale calibrated in the manner illustrated in Fig. X there is thus obtained a direct reading of the freezing point of the solution tested. Similarly, if the scale is calibrated in specific gravities rather than in freezing points, the indicator 5 of the float will fall directly behind a specific gravity calibration curve or between two specific gravity calibration curves and a direct reading of specific gravity can thus be made. It is apparent that this procedure constitutes a marked simplification as contrasted with hydrometers at present generally employed, and that the errors in calculation and in cross reference to auxiliary tables are completely eliminated.

It is to be distinctly understood that my invention is not to be limited to the particular modifications or the particular examples described above. It will be apparent to one skilled in the art that the principle of my hydrometer is applicable to practically all purposes for which hydrometers are employed, and that the range of the instrument is solely a matter of the dimensions chosen.

It will likewise be apparent that numerous modifications or equivalents may be employed without departing from the scope of my invention. Various structural modifications may be made in the form of the hydrometer and in the thermometer and scale mountings. The scale itself may also be modified in numerous respects, as, for example, by color coding or alternately coloring blocks or bands or other insignia on the scale to facilitate reading, if desired. In general, it may be said that any modifications or equivalents which would naturally occur to one skilled in the art are included within the scope of my invention.

My invention now having been described what I claim is:

1. A thermo-hydrometer for reading directly temperature-corrected specific gravities which comprises a receptacle for the liquid, a float positioned in said receptacle and adapted to move freely in said receptacle in a vertical direction, and provided with a visual indicator, temperature indicating means for the liquid having a fixed element and an element movable transversely of the direction of movement of the float, a level indicator for the liquid in the receptacle, and a temperature corrected scale, carried by the receptacle, and in a predetermined relation to the said liquid level indicator and to the fixed element of the temperature indicating means, for reading the specific gravity of the liquid at the level of the said liquid level indicator, alignment of the visual float indicator vertically with the movable element of the temperature indicating means and horizontally with the temperature corrected scale giving the desired reading.

2. A thermo-hydrometer for reading directly temperature-corrected specific gravities which comprises a vertical transparent tube, means for filling said tube to a fixed level with the liquid to be tested, a float positioned in said tube and adapted to move freely within said tube in a vertical direction, a visual indicator positioned at a fixed point on said float, temperature indicating means having a fixed element and an element movable transversely of said tube, the thermo-responsive element thereof being adapted to be contacted with liquid contained in said tube, and a specific gravity scale cooperatively positioned with respect to said fixed liquid level and said temperature indicating means whereby alignment of the indicator on said float with the movable element of said temperature indicating means and said specific gravity scale indicates directly temperature-corrected specific gravity.

3. A thermo-hydrometer for reading directly temperature-corrected specific gravities which comprises a vertical transparent tube, means for filling said tube to a fixed level with the liquid to be tested, a float positioned in said tube and adapted to move freely within said tube in a vertical direction, a visual indicator positioned at a fixed point on said float, a thermometer positioned with its stem horizontally disposed approximately concentrically with respect to said tube and its bulb adapted to be contacted with liquid contained in said tube, and a vertical scale positioned approximately parallel, horizontally, to the said thermometer stem, the said scale being divided into bands, the abscissae of which constitute the range of temperature registrable by the position of the fluid in the stem of the said thermometer, and the ordinates of which constitute specific gravities registrable by the vertical position of the visual indicator on the said float.

4. A thermo-hydrometer for reading directly temperature-corrected specific gravities which comprises a vertical transparent tube, means for filling said tube to a fixed level with the liquid to be tested, a float positioned in said tube and adapted to move freely within said tube in a vertical direction, a visual indicator positioned at a fixed point on said float, a thermometer positioned with its stem horizontally disposed approximately concentrically around at least a portion of said tube and its bulb adapted to be contacted with liquid contained in said tube, a sleeve surrounding said tube and thermometer, the face of said sleeve adjacent to the thermometer being transparent and being positioned horizontally approximately parallel to said thermometer stem, and a scale superimposed on the transparent face of said sleeve, the said scale being divided into bands, the abscissae of which constitute the range of temperature registrable by the position of the fluid in the stem of the said thermometer, and the ordinates of which constitute specific gravities registrable by the vertical position of the visual indicator on the said float.

5. In a hydrometer having a vertical transparent tube, a float therein carrying an indicator element, and a fixed specific gravity scale, scale mounting means comprising a resilient transparent sleeve surrounding the hydrometer tube and spaced therefrom by means of resilient spacing rings, the scale being superimposed upon the said transparent sleeve.

6. In a hydrometer having a vertical transparent tube, a float therein carrying an indicator element, and a fixed specific gravity scale, scale mounting means comprising a resilient transparent sleeve surrounding the hydrometer tube and spaced therefrom by means of resilient spacing rings the scale being superimposed upon the said transparent sleeve, and the said spacing rings being maintained in fixed position relative to the said hydrometer tube by means of projections integral with the said tube and embedded in the said spacing rings.

7. In a thermo-hydrometer having a vertical hydrometer tube adapted to receive liquid and a horizontally positioned thermometer for determining the temperature of the liquid in said tube, thermometer mounting means comprising a thermometer bulb chamber communicating with the interior of said tube and having an exterior opening adapted to receive the thermometer stem, resilient means for positioning the thermometer stem in said exterior opening and maintaining a liquid tight seal, and a resilient positioning member disposed in fixed relation to said hydrometer tube, said positioning member having a horizontal channel adapted to receive and support the free end of said thermometer stem.

8. In a thermo-hydrometer having a vertical hydrometer tube adapted to receive liquid and a horizontally positioned thermometer for determining the temperature of the liquid in said tube, thermometer mounting means comprising a resilient annular member adapted to fit closely around said tube, a thermometer bulb chamber defined within the body of said annular member and communicating with the interior of said tube through an opening in the wall thereof, and a peripheral channel in said annular member communicating with said thermometer bulb chamber through an opening adapted to admit the thermometer bulb to said bulb chamber and to fit tightly around the thermometer stem adjacent the bulb, the said peripheral channel being adapted to receive and support the remaining portion of the said thermometer stem.

JULIAN A. WESSELER.